United States Patent [19]
McCullough

[11] Patent Number: 5,427,061
[45] Date of Patent: Jun. 27, 1995

[54] RESTRAINER TO HOLD AN ANIMAL

[76] Inventor: Harold J. McCullough, 18992-32nd Avenue, Surrey, B.C. V3S 4N8,, Canada

[21] Appl. No.: 247,781

[22] Filed: May 23, 1994

[51] Int. Cl.⁶ .............................................. A01K 27/00
[52] U.S. Cl. ................................. 119/771; 119/792; 119/907
[58] Field of Search ............... 119/771, 792, 793, 856, 119/907

[56] References Cited

U.S. PATENT DOCUMENTS

| | | |
|---|---|---|
| 2,605,744 | 8/1952 | Urbanski ..................... 119/856 X |
| 2,909,154 | 10/1959 | Thomas . | |
| 4,031,859 | 6/1977 | Stewart . | |
| 4,060,056 | 11/1977 | Maietta ........................... 119/793 |
| 4,827,876 | 5/1989 | Krekelberg ..................... 119/771 |
| 4,970,991 | 11/1990 | Luce ................................. 119/771 |

Primary Examiner—Robert P. Swiatek

[57] ABSTRACT

A restrainer to hold an animal in a vehicle. The restrainer has a main belt with an attachment at one end of the main belt. A further attachment on the belt 18 is adjustably movable along the belt and can engage the first attachment. An opening in the main belt allows an end of the main belt to be passed through the opening to form the belt into two loops. The main belt can be attached to an anchor point.

6 Claims, 1 Drawing Sheet

RESTRAINER TO HOLD AN ANIMAL

FIELD OF THE INVENTION

This invention relates to a restrainer to hold an animal. Typically the animal will be a dog or cat or other four legged animal. The invention finds particular application in a road vehicle.

DESCRIPTION OF THE PRIOR ART

It is well known that during vehicle collisions properly adjusted and worn seat belts reduce serious injuries and prevent the occupants from being thrown from the vehicle or against the windshield, a major cause of serious injuries. Seat belts are standard equipment in almost all cars and trucks and their use in many areas is mandatory. While human beings are well protected by seat belts no such restraint system exists for animal passengers such as dogs and cats travelling in the vehicle cab.

Currently animals are often allowed to wander freely throughout the car's interior. In the event of an accident, no matter what the cause, there is a good chance that the animal will sustain serious injuries as it is thrown around the interior of the vehicle and collides with fixed object such as seats, dashboards, or windows. There is also the point that an animal wondering unrestrained in the vehicle is a hazard as it can distract the driver and lead to an accident.

A further possibility is that an unrestrained pet can become a projectile inflicting serious injury to belted human passengers who would otherwise have escaped injury in an accident.

The present invention seeks to provide a restrainer to hold animals to prevent them from being injured or injuring other passengers if an accident occurs and also to prevent animals moving around and distracting the driver.

SUMMARY OF THE INVENTION

Accordingly the present invention is a restrainer to hold an animal in a vehicle and comprising a main belt; first attachment means at one end of the main belt; second attachment means on the belt, adjustably movable along the belt and adapted to releasably engage the first attachment means; a first opening in the main belt whereby an end of the main belt can be passed through the opening to form the belt into two loops; and means to attach the main belt to an anchor point.

In the majority of cases, the anchor point will be an existing seat belt of a vehicle. In a preferred aspect the means to attach the main belt to an anchor point comprises a third attachment means on the main belt; a second belt; a fourth attachment means on the second belt to releasably engage the third attachment means on the main belt; and a second opening in an end of the second belt to engage an anchor point.

DESCRIPTION OF THE DRAWINGS

The invention is illustrated, merely by way of example, in the drawings in which.

DESCRIPTION OF THE PREFERRED EMBODIMENTS

Figure 1:
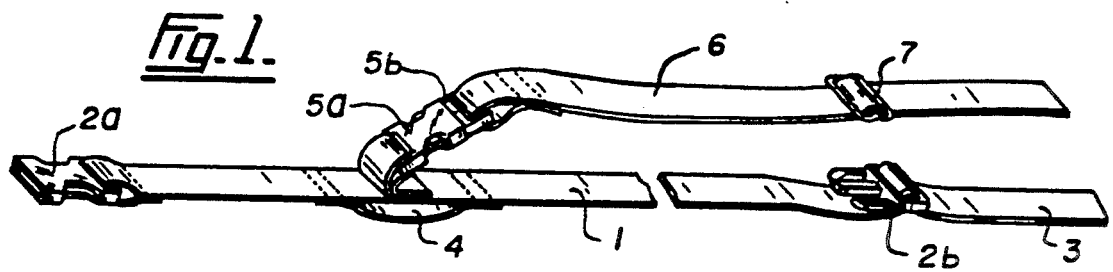
FIG. 1 is a perspective drawing of a preferred embodiment of the restrainer according to the present invention.

The drawings show a preferred embodiment of the present invention suitable for use in a car and comprising a main belt 1 and an attachment belt 6 to connect the main belt to a vehicle's existing seat belt system. The main belt 1 consists of a length of material with fixed female fastener 2a, of known construction at one end and a movable male fastener 2b, of known construction, at the other end 3. A short length of material is attached to the main belt 1 between its ends to form loop 4. Directly above the loop 4, on the opposite side of the main belt 1, is attached a female fastener 5a. Female fastener 5a in turn is connected to male fastener 5b. Male fastener 5b is located at one end of attachment belt 6, while at the opposite end there is an adjustable buckle 7 of conventional construction. Male and female fasteners 5a and 5b are positioned in such a way that main belt 1 and attachment belt 6 have the same longitudinal axis when fasteners 5b and 5a are joined.

Main belt 1 is fitted to any appropriately sized four-legged animal in the following manner as shown particularly in FIG. 2. Main belt end 3, with male fastener 2b, is passed through opening 4 to form a loop 8 and fitted over the animal's head. By pulling on end 3 loop 8 can be enlarged or shrunk to fit snugly around the animal's neck and ensure that female fastener 5a is positioned on the animal's back, between its shoulders.

End 3 and the opposite end with fixed female fastener 2a are then brought down and underneath the animal's body behind its forelegs to form a loop 9. Movable male fastener 2b is adjusted by moving main belt 1 through the fastener body over an integral spanning member, in a known manner, and joined to fixed female fastener 2a in front of the animal's body and behind its fore legs. Thus loop 9 is a snug fit around the animal's torso.

Figure 3:
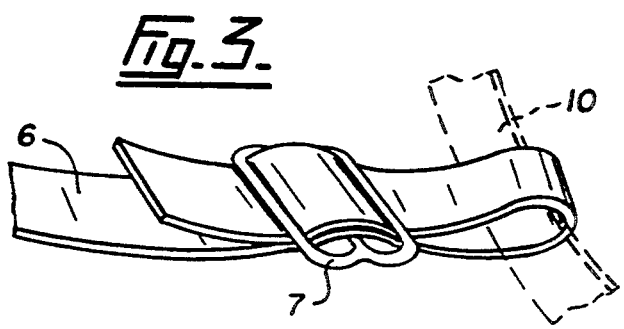
FIG. 3 shows a method of attaching the seat belt to a vehicle's existing seat belt.
Figure 4:
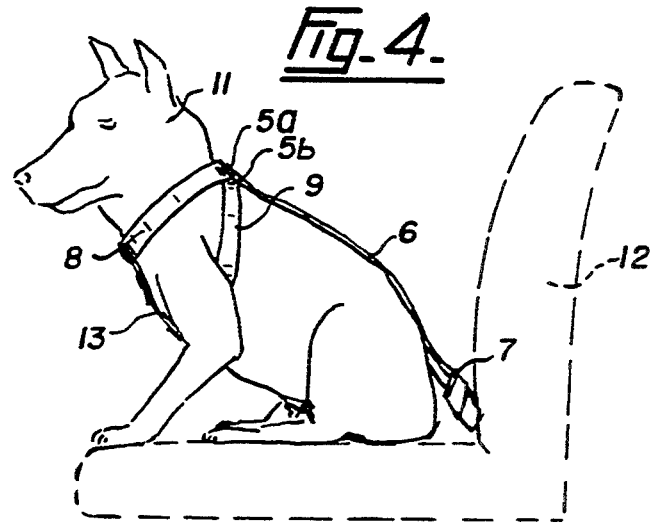
FIG. 4 shows a dog fitted with the seat belt system in a car seat.

Attachment belt 6 is attached to a standard car seat belt 10 using buckle 7, as shown in FIG. 3. Attachment belt 6 is looped around a fastened car seat belt which is adjusted tightly against the car seat 12 shown in FIG. 4 and the attachment belt is threaded through buckle 7 in a known manner to secure the animal seat belt system to the car seat.

The attachment belt length is adjusted at buckle 7 to allow the animal 11 to sit, stand or lie down and at the same time prevent it from contacting any solid object should it be thrown forward in a crash.

The attachment belt can be left in the car permanently attached to an existing car seat belt. An animal wearing the harness belt can be released from the seat belt system by releasing fastener 5a of harness belt 1 from fastener 5b of attachment belt 6.

Figure 2:
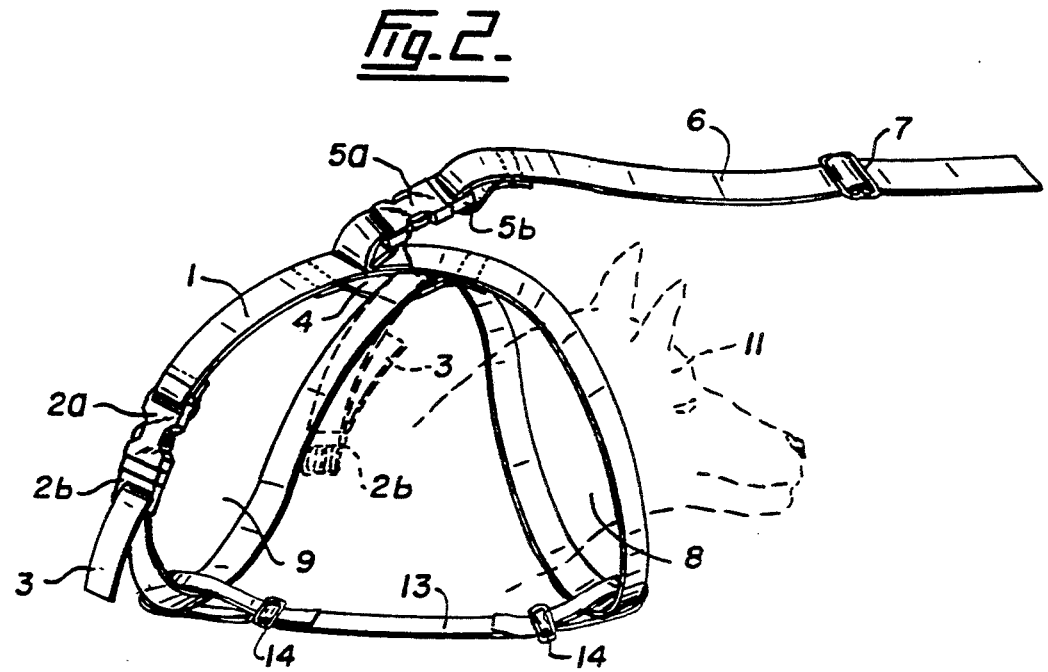
FIG. 2 is a perspective drawing showing the harness means formed to its useful position.

Although not essential, it is desirable to include an additional belt 13, attached by buckles 14 and extending between loops 8 and 9 as shown particularly in FIG. 2. This additional belt helps to stabilize the positioning of the restrainer on the animal.

The belt length may be made of woven nylon, known for its strength. As illustrated in the drawings the fastening members, for example 5a and 5b, are desirably the prong members that are received within a housing and resile outwardly. Such members are well known and are, for example, the subject of Canadian patents 1,064,226 and 1,093,285. As shown in FIG. 3 the attachment 7 may be a simple buckle, chosen for its ease of adjustment of length. When properly fitted to an animal the restraining means of the invention, formed into a double loop assembly around the animal's neck and chest, behind its forelegs, provides excellent security of the animal and prevents even a large dog from moving around the interior of the car.

The embodiments of the invention in which an exclusive property or privilege is claimed are defined as follows:

1. A restrainer to hold an animal in a vehicle and comprising:

a main belt;

first attachment means at one end of the main belt;

second attachment means on the belt, adjustably movable along the belt and adapted to releasably engage the first attachment means;

a first opening in the main belt whereby an end of the main belt can be passed through the opening to form the belt into two loops;

means to attach the main belt to an anchor point comprising a third attachment means on the main belt;

a second belt;

a fourth attachment means on the second belt to releasably engage the third attachment means on the main belt; and a second opening in an end of the second belt to engage the anchor point.

2. A restrainer as claimed in claim 1 in which the fourth attachment means in the belt is located on the exterior of the opening.

3. A restrainer as claimed in claim 1 in which the second opening is adjustable.

4. A restrainer as claimed in claim 3 in which the second opening is defined by a part of the second belt folded back on itself and secured with a slidable buckle.

5. A restrainer as claimed in claim 1 in which the anchor point is the existing seat belt of a vehicle.

6. A restrainer as claimed in claim 1 including a bracing belt extending between the two loops when the restrainer is in position.

* * * * *